US007016306B2

(12) United States Patent
Alapuranen et al.

(10) Patent No.: US 7,016,306 B2
(45) Date of Patent: Mar. 21, 2006

(54) SYSTEM AND METHOD FOR PERFORMING MULTIPLE NETWORK ROUTING AND PROVISIONING IN OVERLAPPING WIRELESS DEPLOYMENTS

(75) Inventors: Pertti O. Alapuranen, Melbourne, FL (US); Kevin L. Farley, Orlando, FL (US)

(73) Assignee: Meshnetworks, Inc., Maitland, FL (US)

( * ) Notice: Subject to any disclaimer, the term of this patent is extended or adjusted under 35 U.S.C. 154(b) by 10 days.

(21) Appl. No.: 10/146,041

(22) Filed: May 16, 2002

(65) Prior Publication Data

US 2003/0214921 A1 Nov. 20, 2003

(51) Int. Cl.
H04L 12/28 (2006.01)
H04Q 7/20 (2006.01)
G06F 13/14 (2006.01)

(52) U.S. Cl. .............. 370/238; 370/338; 370/400; 455/445; 709/241

(58) Field of Classification Search ............... 370/389, 370/392, 396, 395.21, 395.31, 395.32, 400, 370/401, 310, 349, 328, 231, 235, 238, 338; 709/220, 223, 230, 238, 241; 455/445
See application file for complete search history.

(56) References Cited

U.S. PATENT DOCUMENTS

| | | | |
|---|---|---|---|
| 4,494,192 A | 1/1985 | Lew et al. ............. 710/112 |
| 4,617,656 A | 10/1986 | Kobayashi et al. ....... 370/445 |
| 4,736,371 A | 4/1988 | Tejima et al. .......... 370/236 |
| 4,742,357 A | 5/1988 | Rackley .............. 342/457 |
| 4,747,130 A | 5/1988 | Ho ................... 379/269 |
| 4,910,521 A | 3/1990 | Mellon ............... 342/45 |
| 5,034,961 A | 7/1991 | Adams ............... 375/130 |
| 5,068,916 A | 11/1991 | Harrison et al. ......... 455/39 |
| 5,231,634 A | 7/1993 | Giles et al. ............ 370/348 |
| 5,233,604 A | 8/1993 | Ahmadi et al. .......... 370/238 |
| 5,241,542 A | 8/1993 | Natarajan et al. ........ 370/311 |
| 5,317,566 A | 5/1994 | Joshi ................ 370/238 |
| 5,392,450 A | 2/1995 | Nossen .............. 455/12.1 |
| 5,412,654 A | 5/1995 | Perkins .............. 370/312 |
| 5,424,747 A | 6/1995 | Chazelas ............. 342/70 |
| 5,502,722 A | 3/1996 | Fulghum ............. 370/343 |
| 5,517,491 A | 5/1996 | Nanni et al. .......... 370/252 |
| 5,555,425 A | 9/1996 | Zeller et al. .......... 710/111 |
| 5,555,540 A | 9/1996 | Radke .............. 370/462 |
| 5,572,528 A | 11/1996 | Shuen .............. 370/402 |
| 5,615,212 A | 3/1997 | Ruszczyk et al. ....... 370/433 |
| 5,618,045 A | 4/1997 | Kagan et al. .......... 463/40 |
| 5,621,732 A * | 4/1997 | Osawa .............. 370/346 |

(Continued)

FOREIGN PATENT DOCUMENTS

CA 2132180 3/1996

(Continued)

OTHER PUBLICATIONS

Johnson, "Routing in Ad Hoc Networks of Mobile Hosts", 1995, IEEE, PP. 158-163.*

(Continued)

*Primary Examiner*—Alpus H. Hsu
(74) *Attorney, Agent, or Firm*—Randi L. Karpinia; Joseph J. Buczynski

(57) ABSTRACT

A system and method for transmitting data in a wireless network is provided. Routing table information includes a system weight associated with each available node. An optimal node is selected based at least in part on the system weight, quality of service requirements, among other factors associated with each available node. Nodes are preferably selected on a per packet basis.

32 Claims, 4 Drawing Sheets

U.S. PATENT DOCUMENTS

| | | | |
|---|---|---|---|
| 5,623,495 A | 4/1997 | Eng et al. | 370/397 |
| 5,627,976 A | 5/1997 | McFarland et al. | 710/309 |
| 5,631,897 A | 5/1997 | Pacheco et al. | 370/237 |
| 5,644,576 A | 7/1997 | Bauchot et al. | 370/437 |
| 5,649,108 A * | 7/1997 | Spiegel et al. | 709/241 |
| 5,652,751 A | 7/1997 | Sharony | 370/227 |
| 5,680,392 A | 10/1997 | Semaan | 370/261 |
| 5,684,794 A | 11/1997 | Lopez et al. | 370/337 |
| 5,687,194 A | 11/1997 | Paneth et al. | 375/283 |
| 5,696,903 A | 12/1997 | Mahany | 709/228 |
| 5,701,294 A | 12/1997 | Ward et al. | 370/252 |
| 5,706,428 A | 1/1998 | Boer et al. | 370/342 |
| 5,717,689 A | 2/1998 | Ayanoglu | 370/349 |
| 5,745,483 A | 4/1998 | Nakagawa et al. | 370/335 |
| 5,774,876 A | 6/1998 | Woolley et al. | 705/28 |
| 5,781,540 A | 7/1998 | Malcolm et al. | 370/321 |
| 5,787,080 A | 7/1998 | Hulyalkar et al. | 370/310.2 |
| 5,794,154 A | 8/1998 | Bar-On et al. | 455/509 |
| 5,796,732 A | 8/1998 | Mazzola et al. | 370/362 |
| 5,796,741 A | 8/1998 | Saito et al. | 370/439 |
| 5,805,593 A | 9/1998 | Busche | 370/396 |
| 5,805,842 A | 9/1998 | Nagaraj et al. | 710/313 |
| 5,805,977 A | 9/1998 | Hill et al. | 340/7.22 |
| 5,809,518 A | 9/1998 | Lee | 711/115 |
| 5,822,309 A | 10/1998 | Ayanoglu et al. | 370/315 |
| 5,844,905 A | 12/1998 | McKay et al. | 370/443 |
| 5,845,097 A | 12/1998 | Kang et al. | 710/117 |
| 5,857,084 A | 1/1999 | Klein | 710/305 |
| 5,870,350 A | 2/1999 | Bertin et al. | 365/233 |
| 5,877,724 A | 3/1999 | Davis | 342/357.1 |
| 5,881,095 A | 3/1999 | Cadd | 375/132 |
| 5,881,372 A | 3/1999 | Kruys | 455/113 |
| 5,886,992 A | 3/1999 | Raatikainen et al. | 370/410 |
| 5,896,561 A | 4/1999 | Schrader et al. | 455/67.11 |
| 5,903,559 A | 5/1999 | Acharya et al. | 370/355 |
| 5,909,651 A | 6/1999 | Chander et al. | 455/466 |
| 5,936,953 A | 8/1999 | Simmons | 370/364 |
| 5,943,322 A | 8/1999 | Mayor et al. | 370/280 |
| 5,987,011 A * | 11/1999 | Toh | 370/331 |
| 5,987,033 A | 11/1999 | Boer et al. | 370/445 |
| 5,991,279 A | 11/1999 | Haugli et al. | 370/311 |
| 6,028,853 A | 2/2000 | Haartsen | 370/338 |
| 6,028,857 A * | 2/2000 | Poor | 370/351 |
| 6,029,217 A | 2/2000 | Arimilli et al. | 710/107 |
| 6,034,542 A | 3/2000 | Ridgeway | 326/39 |
| 6,044,062 A | 3/2000 | Brownrigg et al. | 370/238 |
| 6,047,330 A | 4/2000 | Stracke, Jr. | 709/238 |
| 6,052,594 A | 4/2000 | Chuang et al. | 455/450 |
| 6,052,752 A | 4/2000 | Kwon | 710/306 |
| 6,064,626 A | 5/2000 | Stevens | 365/233 |
| 6,067,291 A | 5/2000 | Kamerman et al. | 370/338 |
| 6,078,566 A | 6/2000 | Kikinis | 370/286 |
| 6,104,712 A | 8/2000 | Robert et al. | 370/389 |
| 6,108,738 A | 8/2000 | Chambers et al. | 710/113 |
| 6,115,580 A | 9/2000 | Chuprun et al. | 455/1 |
| 6,122,690 A | 9/2000 | Nannetti et al. | 710/311 |
| 6,130,881 A | 10/2000 | Stiller et al. | 370/238 |
| 6,132,306 A | 10/2000 | Trompower | 453/11.1 |
| 6,147,975 A | 11/2000 | Bowman-Amuah | 370/252 |
| 6,163,699 A | 12/2000 | Naor et al. | 455/453 |
| 6,178,337 B1 | 1/2001 | Spartz et al. | 455/561 |
| 6,192,053 B1 | 2/2001 | Angelico et al. | 370/462 |
| 6,192,230 B1 | 2/2001 | Van Bokhorst et al. | 455/343.3 |
| 6,208,870 B1 | 3/2001 | Lorello et al. | 455/466 |
| 6,223,240 B1 | 4/2001 | Odenwald et al. | 710/311 |
| 6,240,294 B1 | 5/2001 | Hamilton et al. | 455/456.3 |
| 6,246,875 B1 | 6/2001 | Seazholtz et al. | 455/432.1 |
| 6,249,516 B1 | 6/2001 | Brownrigg et al. | 370/338 |
| 6,275,707 B1 | 8/2001 | Reed et al. | 455/456.3 |
| 6,285,892 B1 | 9/2001 | Hulyalkar | 455/574 |
| 6,304,556 B1 | 10/2001 | Haas | 370/254 |
| 6,327,300 B1 | 12/2001 | Souissi et al. | 375/219 |
| 6,349,091 B1 * | 2/2002 | Li | 370/238 |
| 6,349,210 B1 | 2/2002 | Li | 455/450 |
| 6,480,505 B1 * | 11/2002 | Johansson et al. | 370/449 |
| 6,873,839 B1 * | 3/2005 | Stanforth | 455/343.2 |
| 6,904,275 B1 * | 6/2005 | Stanforth | 455/343.1 |
| 2001/0003191 A1 * | 6/2001 | Kovacs et al. | 709/226 |
| 2001/0053699 A1 | 12/2001 | McCrady et al. | 455/513 |
| 2002/0026528 A1 * | 2/2002 | Souissi et al. | 455/41 |
| 2002/0035699 A1 * | 3/2002 | Crosbie | 713/201 |
| 2002/0044549 A1 * | 4/2002 | Johansson et al. | 370/386 |
| 2002/0059434 A1 * | 5/2002 | Karaoguz et al. | 709/228 |
| 2002/0122410 A1 * | 9/2002 | Kulikov et al. | 370/349 |
| 2002/0142721 A1 * | 10/2002 | Souissi et al. | 455/41 |
| 2003/0033394 A1 * | 2/2003 | Stine | 709/222 |
| 2003/0045295 A1 * | 3/2003 | Stanforth | 455/445 |
| 2003/0053437 A1 * | 3/2003 | Bahl et al. | 370/345 |
| 2003/0054818 A1 * | 3/2003 | Bahl et al. | 455/432 |
| 2003/0100308 A1 * | 5/2003 | Rusch | 455/445 |

FOREIGN PATENT DOCUMENTS

| | | |
|---|---|---|
| EP | 0513841 A2 | 11/1992 |
| EP | 0627827 A2 | 12/1994 |
| EP | 0924890 A2 | 6/1999 |
| FR | 2683326 | 7/1993 |
| WO | WO 9608884 | 3/1996 |
| WO | WO 9724005 | 7/1997 |
| WO | WO 9839936 | 9/1998 |
| WO | WO 9912302 | 3/1999 |
| WO | WO 0034932 | 6/2000 |
| WO | WO 0110154 | 2/2001 |
| WO | WO 0133770 | 5/2001 |
| WO | WO 0135567 | 5/2001 |
| WO | WO 0137481 | 5/2001 |
| WO | WO 0137482 | 5/2001 |
| WO | WO 0137483 | 5/2001 |
| WO | WO 0235253 | 5/2002 |

OTHER PUBLICATIONS

Royer and Toh, "A Review of Current Routing Protocols for Ad Hoc Mobile Wireless Networks", Apr. 1999, IEEE Personal Communications, pp. 46-55.*

Wong et al., "Soft Handoffs in CDMA Mobile Systems", Dec. 1997, IEEE Personal Communications.

Wong et al., "A Pattern Recognition System for Handoff Algorithms", Jul. 2000, IEEE Journal on Selected Areas in Communications, vol. 18, No. 7.

Andras G. Valko, "Cellular IP: A New Approach to Internet Host Mobility", Jan. 1999, ACM Computer Communication Review.

Richard North, Dale Bryan and Dennis Baker, "Wireless Networked Radios: Comparison of Military, Commercial, and R&D Protocols", Feb. 28-Mar. 3, 1999, 2nd Annual UCSD Conference on Wireless Communications, San Diego CA.

Benjamin B. Peterson, Chris Kmiecik, Richard Hartnett, Patrick M. Thompson, Jose Mendoza and Hung Nguyen, "Spread Spectrum Indoor Geolocation", Aug. 1998, Navigation: Journal of the Institute of Navigation, vol. 45, No. 2, summer 1998.

Josh Broch, David A. Maltz, David B. Johnson, Yih-Chun Hu and Jorjeta Jetcheva, "A Performance Comparison of Multi-Hop Wireless Ad Hoc Network Routing Protocols", Oct. 25-30, 1998, Proceedings of the 4th Annual ACM/IEEE International Conference on Mobile Computing and Networking.

C. David Young, "USAP: A Unifying Dynamic Distributed Multichannel TDMA Slot Assignment Protocol".

Chip Elliott and Bob Heile, "Self-Organizing, Sef-Healing Wireless Networks", 2000 IEEE.

J.J. Garcia-Luna-Aceves and Asimakis Tzamaloukas, "Reversing the Collision-Avoidance Handshake in Wireless Networks".

J.J. Garcia-Luna-Aceves and Marcelo Spohn, "Transmission-Efficient Routing in Wireless Networks Using Link-State Information".

J.J. Garcia-Luna-Aceves and Ewerton L. Madruga, "The Core-Assisted Mesh Protocol", Aug. 1999, IEEE Journal on Selected Areas in Communications, vol. 17, No. 8.

Ad Kamerman and Guido Aben, "Net Throughput with IEEE 802.11 Wireless LANs".

J.R. McChesney and R.J. Saulitis, "Optimization of an Adaptive Link Control Protocol for Multimedia Packet Radio Networks".

Ram Ramanathan and Regina Rosales-Hain, "Topology Control of Multihop Wireless Networks using Transmit Power Adjustment".

Ram Ramanathan and Martha E. Steenstrup, "Hierarchically-Organized, multihop Mobile Wireless Networks for Quality-of-Service Support".

Matha E. Steenstrup, "Dynamic Multipoint Virtual Circuits for Multimedia Traffic in Multihop Mobile Wireless Networks".

Zhenyu Tang and J.J. Garcia-Luna-Aceves, "Collision-Avoidance Transmission Scheduling for Ad-Hoc Networks".

George Vardakas and Wendell Kishaba, "QoS Networking With Adaptive Link Control and Tactical Multi-Channel Software Radios".

S. Chen et al., "Distributed Quality-of-Service Routing in Ad Hoc Networks," IEEE Journal on Selected Areas in Communications, vol. 17, No. 8, Aug. 1999, pp. 1488-1505.

* cited by examiner

SYSTEM AND METHOD FOR PERFORMING MULTIPLE NETWORK ROUTING AND PROVISIONING IN OVERLAPPING WIRELESS DEPLOYMENTS

BACKGROUND OF THE INVENTION

1. Field of the Invention

The present invention relates to a system and method for using weights associated with various network operators to determine the optimal link for use in Layer II routing in a network, such as an 802.11 network. More particularly, the present invention relates to a system and method for using weights assigned to links associated with particular network systems in an overlapping multiple system environment to compute the optimum path between nodes in a communication network, such as an 802.11 network, in order to select the most suitable link over which to send data packets between the nodes.

2. Description of the Related Art

In recent years, a type of mobile communications network known as an "ad-hoc" network has been developed. In this type of network, each user terminal (hereinafter "mobile node") is capable of operating as a base station or router for the other mobile nodes, thus eliminating the need for a fixed infrastructure of base stations. Accordingly, data packets being sent from a source mobile node to a destination mobile node are typically routed through a number of intermediate mobile nodes before reaching the destination mobile node.

Details of an ad-hoc network are set forth in U.S. Pat. No. 5,943,322 to Mayor, the entire content of which is incorporated herein by reference. More sophisticated ad-hoc networks are also being developed which, in addition to enabling mobile nodes to communicate with each other as in a conventional ad-hoc network, further enable the mobile nodes to access a fixed network and thus communicate with other types of user terminals, such as those on the public switched telephone network (PSTN) and on other networks such as the Internet. Details of these types of ad-hoc networks are described in U.S. patent application Ser. No. 09/897,790 entitled "Ad Hoc Peer-to-Peer Mobile Radio Access System Interfaced to the PSTN and Cellular Networks", filed on Jun. 29, 2001, in U.S. patent application Ser. No. 09/815,157 entitled "Time Division Protocol for an Ad-Hoc, Peer-to-Peer Radio Network Having Coordinating Channel Access to Shared Parallel Data Channels with Separate Reservation Channel", filed on Mar. 22, 2001, and in U.S. patent application Ser. No. 09/815,164 entitled "Prioritized-Routing for an Ad-Hoc, Peer-to-Peer, Mobile Radio Access System", filed on Mar. 22, 2001, the entire content of each of said patent applications being incorporated herein by reference.

As can be appreciated by one skilled in the art, when a node sends packetized data to a destination node, the node typically checks its routing table to determine whether the destination node is contained in its routing table. If the destination node is contained in the node's routing table, the data is transmitted via a path that leads to the destination node. If the destination node is not listed in the node's routing table, then the packet is sent to one or more other nodes listed in the node's routing table, and those other nodes determine if the destination table is listed in their routing tables. The process continues until the data packet eventually reaches the destination node.

In these types of ad-hoc networks, the algorithms that are used to determine the path of intermediate nodes via which the data packets are routed between source and destination nodes are typically based on the shortest distance between the source and destination nodes or, assuming that the data packet transport medium is wireless, the least power required to perform the routing. However, such algorithms do not necessarily optimize the cost associated with delivery of data packets. For example, routing of data packets can be delayed due to congestion in intermediate nodes. Also, delivery failure of data packets can occur on noisy radio links between nodes. Moreover, because many of the nodes are mobile, the conditions of the links can be constantly changing. Finally, some routes may require the use of equipment belonging to another network, and therefore incur an additional cost for delivery.

Currently, ad-hoc wireless communications networks, and especially those employing terminals which operate in accordance with 802.11 standards, do not take into account the cost associated with the use of "out of network" equipment when determining the suitability of a link for use in sending data packets between nodes. Details of the 802.11 standards are set forth in ISO/IEC 8802-11, ANSI/IEEE 802.11 "Information Technology—Telecommunications and Information Exchange Between Systems—Local and Metropolitan Area Network Specific Requirements", Part 11: Wireless Medium Access Control (MAC) and Physical Layer (PHY) Specifications, the entire contents of which being incorporated herein by reference. Also, a description of the 802.11 standard is found in a book by Bob O'Hara and Al Petrick entitled *IEEE 802.11 Handbook: A Designer's Companion*, IEEE, 1999, the entire contents of which being incorporated herein by reference.

In cellular systems, it is common for operators of different cellular systems to form cooperative agreements with one another so that subscribers of either system can utilize the infrastructure of either system. The cellular system operators typically form inter-system service level agreements which define how each system will account for and be compensated for usage of the system by subscribers of another system. In this manner, cellular system operators can offer subscribers access to more infrastructure and therefore a broader coverage area.

Similarly, it is possible for the service areas of multiple ad-hoc peer-to-peer networks to overlap. When they do, it is often advantageous for the operators of the multiple networks to enter into inter-system service level agreements to allow cooperative routing between network elements in the multiple systems. Unfortunately, there is an opportunity for fraud and abuse in this system when a system operator falsely advertises routes to gain more traffic share, or to starve another system of traffic load. Even in the absence of fraud or abuse, it would be advantageous for a system operator to selectively choose routes according to the system associated with the infrastructure utilized in each route.

Accordingly, a need exists for a system and method which enables a wireless ad-hoc communications network, such as an 802.11 network, to evaluate the cost associated with various links between nodes in order to determine which link to use for data packet routing between the nodes. The cost is based at least in part on the system to which equipment along the link belongs, and the inter-system service level agreements in place between system operators.

SUMMARY OF THE INVENTION

An object of the present invention is to provide a system and method for minimizing the cost of operating a wireless network by taking into consideration the cost of transmitting packets through infrastructure nodes controlled by another entity.

Another object of the present invention is to improve the security of an ad-hoc wireless network by identifying available nodes and the network operators associated with the available nodes, and transmitting packets through only trusted systems.

These and other objects are substantially achieved by providing a system and method for communicating in a wireless network. A system in accordance with the present invention employs a node comprising a transceiver adapted to transmit a signal to at least one of a plurality of other nodes. The node further includes a memory for storing routing information, which can be in the form of a routing table, that comprises a system weight associated with each other node. The node further includes a controller adapted to control the transceiver to transmit a signal to one the nodes based on the routing table and system weight associated with each node.

The invention is further embodied in a method of controlling a communications system. The method includes determining a set of available nodes from a routing table, determining a system identification associated with each available node, determining a system weight associated with each system identification, calculating a cost associated with transmitting to each available node based on the system weights, selecting one of the available nodes based on the cost, and transmitting data to the selected node.

BRIEF DESCRIPTION OF THE DRAWINGS

These and other objects, advantages and novel features of the invention will be more readily appreciated from the following detailed description when read in conjunction with the accompanying drawings, in which.

In the figures, it will be understood that like numerals refer to like features and structures.

DETAILED DESCRIPTION OF THE PREFERRED EMBODIMENTS

Figure 1:
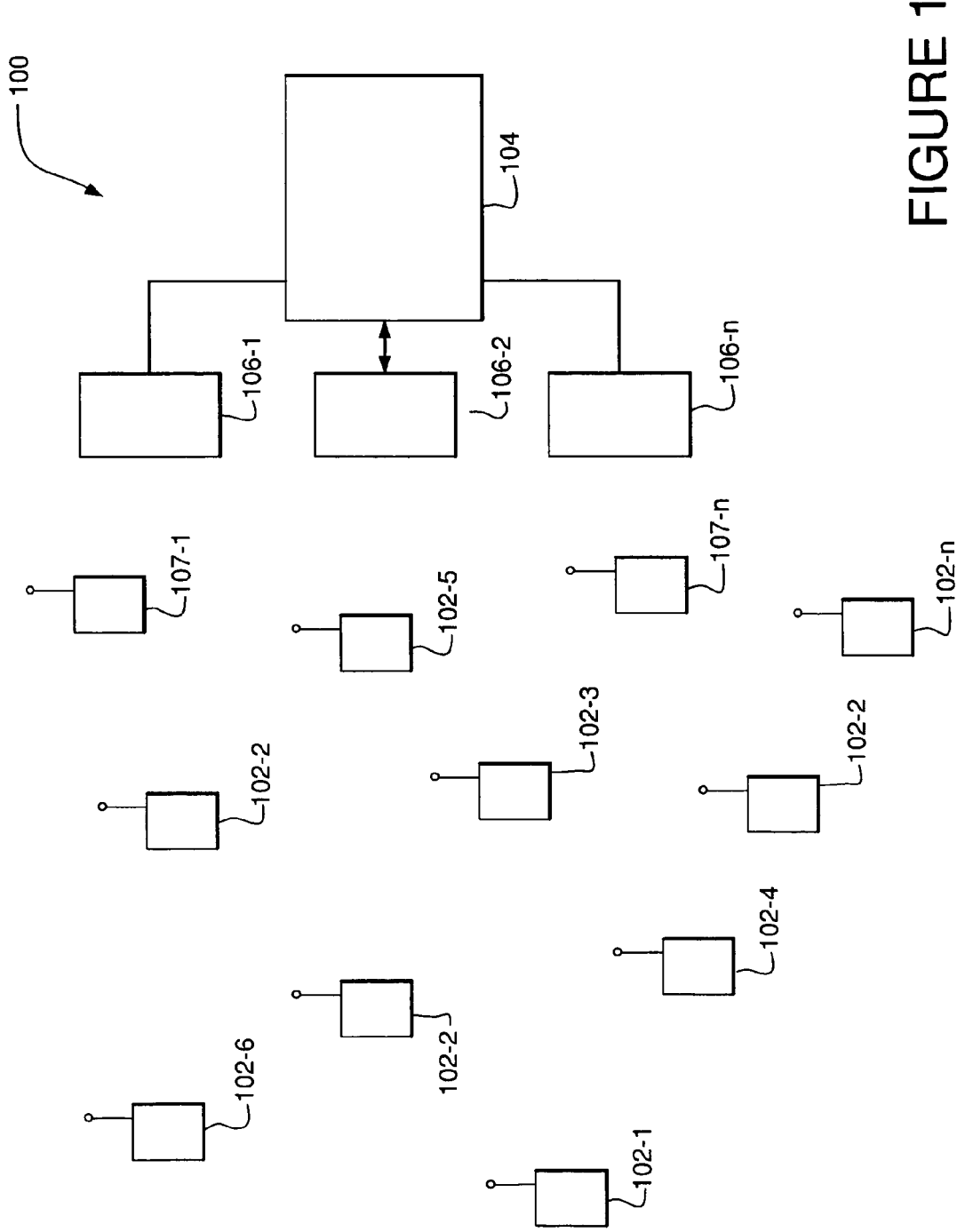
FIG. 1 is a block diagram of an example of an ad-hoc wireless communications network employing a system and method for evaluating the cost of links between nodes based on inter-system service level agreements in a multiple system environment according to an embodiment of the present invention.

FIG. 1 is a block diagram illustrating an example of an ad-hoc packet-switched wireless communications network 100 employing an embodiment of the present invention. Specifically, the network 100 includes a plurality of mobile wireless user terminals 102-1 through 102-n (referred to generally as nodes or mobile nodes 102), and a fixed network 104 having a plurality of access points 106-1, 106-2, . . . 106-n (referred to generally as nodes or access points 106), for providing the nodes 102 with access to the fixed network 104. The fixed network 104 includes, for example, a core local access network (LAN), and a plurality of servers and gateway routers, to thus provide the nodes 102 with access to other networks, such as other ad-hoc networks, the public switched telephone network (PSTN) and the Internet. The network 100 further includes a plurality of fixed routers 107-1 through 107-n (referred to generally as nodes or fixed routers 107) for routing data packets between other nodes 102, 106 or 107.

Figure 2:
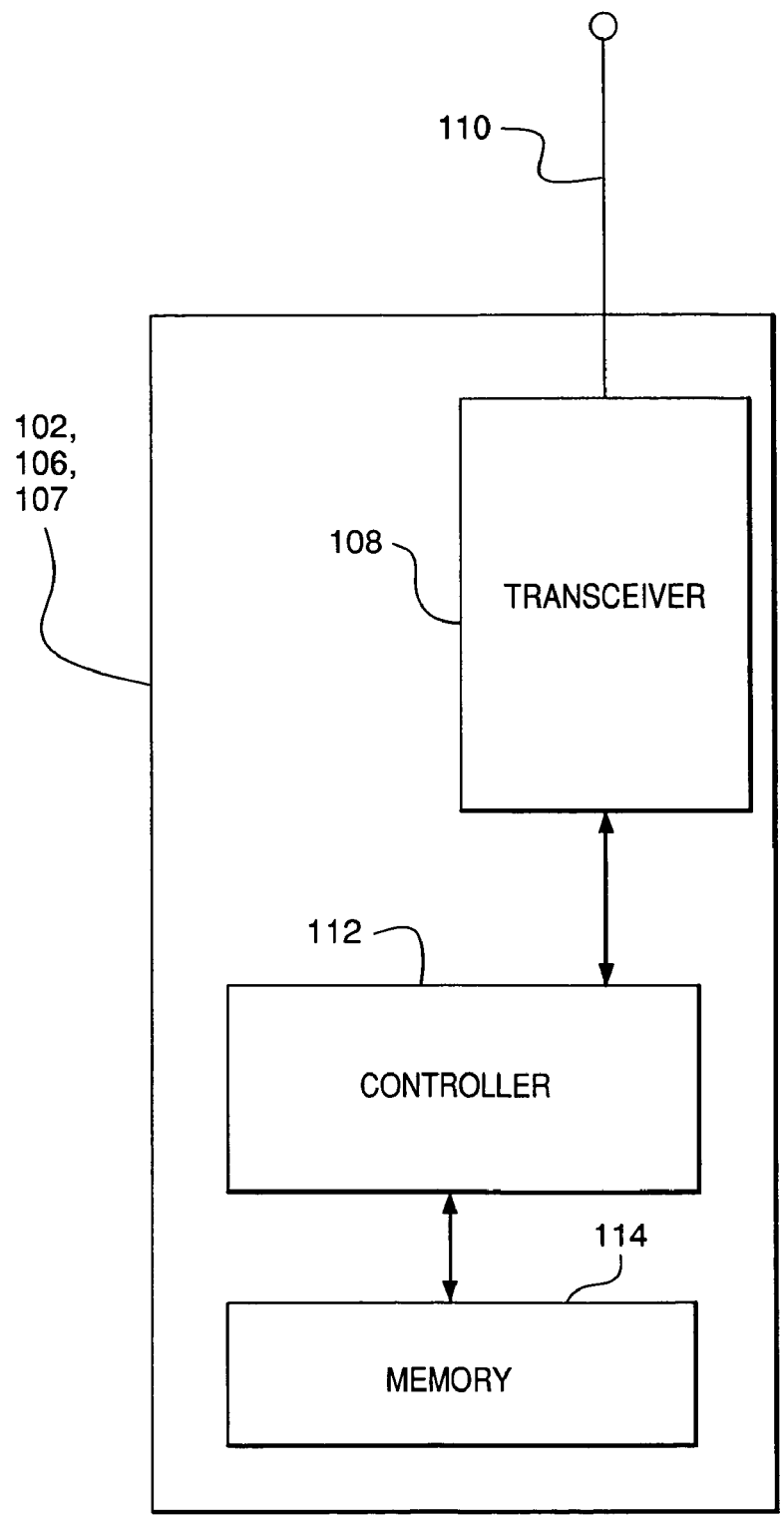
FIG. 2 is a block diagram illustrating an example of components of a node employed in the network shown in FIG. 1.

As can be appreciated by one skilled in the art, the nodes 102, 106 and 107 are capable of communicating with each other directly, or via one or more other nodes 102, 106 or 107 operating as a router or routers for data packets being sent between nodes 102, as described in U.S. Pat. No. 5,943,322 to Mayor, and in U.S. patent application Ser. Nos. 09/897,790, 09/815,157 and 09/815,164, referenced above. Specifically, as shown in FIG. 2, each node 102, 106 and 107 includes a transceiver 108 which is coupled to an antenna 110 and is capable of receiving and transmitting signals, such as packetized data signals, to and from the node 102, 106 or 107, under the control of a controller 112. The packetized data signals can include, for example, voice, data or multimedia.

Each node 102, 106 and 107 further includes a memory 114, such as a random access memory (RAM), that is capable of storing, among other things, routing information pertaining to itself and other nodes 102, 106 or 107 in the network 100. The nodes 102, 106 and 107 exchange their respective routing information, referred to as routing advertisements or routing table information, with each other via a broadcasting mechanism periodically, for example, when a new node 102 enters the network 100, or when existing nodes 102 in the network 100 move. A node 102, 106 or 107 will broadcast its routing table updates, and nearby nodes 102, 106 or 107 will only receive the broadcast routing table updates if within broadcast range (e.g., radio frequency (RF) range) of the broadcasting node 102, 106 or 107. For example, assuming that nodes 102-1, 102-2 and 102-7 are within the RF broadcast range of node 102-6, when node 102-6 broadcasts its routing table information, that information is received by nodes 102-1, 102-2 and 102-7. However, if nodes 102-3, 102-4 and 102-5 through 102-n are out of the broadcast range, none of those nodes will receive the broadcast routing table information from node 102-6.

Figure 3:
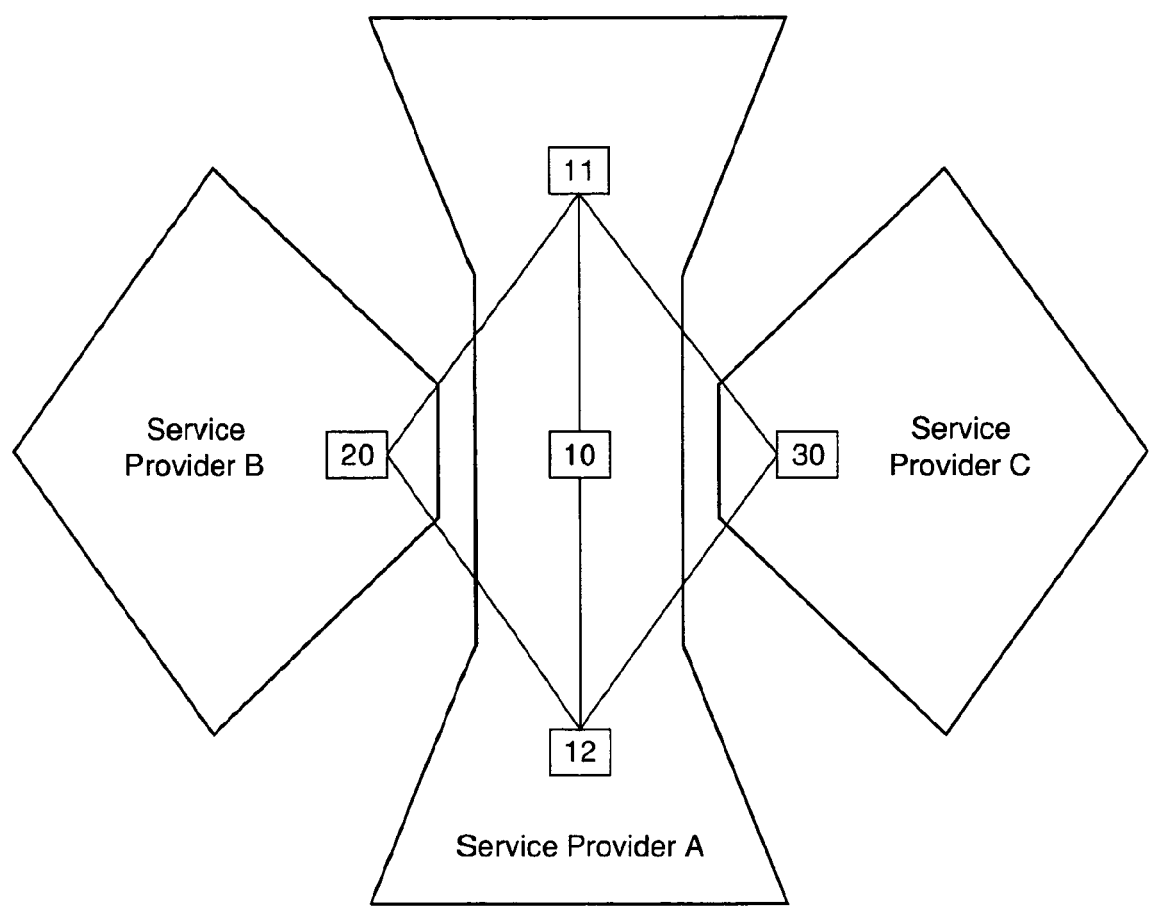
FIG. 3 is a block diagram depicting a comparison of the cost associated with three different routes between nodes in the ad-hoc wireless communications network shown in FIG. 1 and other networks according to an embodiment of the present invention.

FIG. 3 illustrates three possible routes for communication between a sending node 11 and a receiving node 12 in a multiple service provider environment. A first route exists from node 11 through intermediate node 10 to node 12. In the first route, each of the three nodes involved are associated with Service Provider A. A second route from node 11 through node 20 to node 12 involves the use of a node 20 that is associated with Service Provider B. Finally, a third route from node 11 through node 30 to node 12 involves the use of node 30 that is associated with Service Provider C.

Service providers provision their own infrastructure equipment, and their subscriber's devices with system identifiers and system weights associated with each system with which an established cooperative agreement has been established. A table of system weights is stored, for example, in the memory 114 of each node 102, 106 or 107. Thus, when a wireless transceiver begins to select a next-hop route from its neighbor list, it uses the system weight associated with each possible link to minimize the overall cost of the packet route. It should be noted that other considerations may also be taken into consideration by a transmitting node selecting among possible routes, including preferably Quality of Service (QoS) requirements. Thus, where a node 11 has a choice between three routes 11-20-12, 11-10,12, and 11-30, 12, with other factors being equal, the node will select the "in-house" route rather than a more expensive route through another provider's node. However, if the in-house route is unavailable, the node can choose a "foreign" node through which to pass packets in order to maintain QoS requirements.

Figure 4:
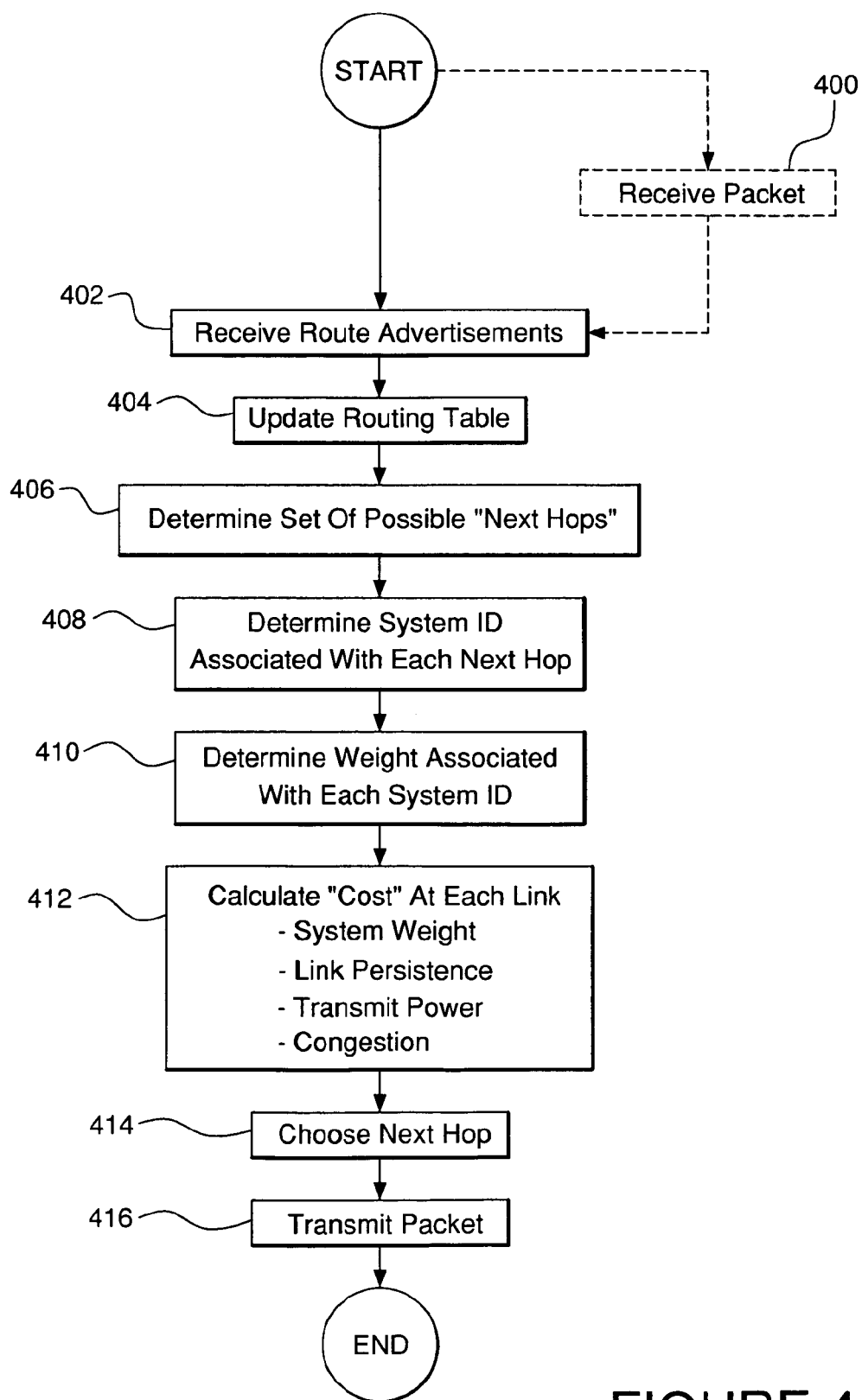
FIG. 4 is a flowchart illustrating a method of determining an optimum route according to an embodiment of the present invention.

FIG. 4 is a flowchart illustrating a method of selecting a next-hop link according to an embodiment of the present invention. A node 102, 106, 107 such as those illustrated in FIG. 2, optionally receives a packet to be transmitted from the node at step 400. Alternatively, the node may originate the packet to be transmitted. At step 402, route advertisements are received from nearby nodes. The node 102, 106, 107 updates its routing table based on the route advertisements received at step 404. At step 406, the node determines the set of "next hop" links that are possible, based on the routing table. The system id associated with each next-hop node is determined at step 408. For each system id in the list of possible next-hops, the node retrieves the weight associated with each system id, at step 410, and calculates a "system weight" for each link. The weight is based on service level cooperation agreements between service providers.

The cost of each possible link is evaluated at step 412. In addition to the system weight calculated, the cost of each possible link takes into account link persistence, transmit power, congestion, and QoS requirements, among other possible factors. At step 414, the node 102, 106, 107 selects the optimum next-hop link, and the packet is transmitted over the selected link at step 416. Process steps 400-416 are preferably repeated for each packet to be transmitted.

It will be appreciated that the present invention can be applied to a wide variety of network topologies and protocols. Thus, for example, in an IPv4 packet network, the IP subnet number (appropriately masked) is used to uniquely identify a particular IPv4 provider. Similarly, if routing is augmented, or supplanted, by Link Layer mechanisms, then Layer 2 identifiers are used to uniquely identify the provider.

A system and method according to the present invention is further advantageous in its response to "rogue" routers advertising links. In the event that a rogue router comes on-line and advertises routes, a device according to the present invention checks the system id of the rogue router. Because the device is not provisioned with the system id of the rogue router, the device can ignore the rogue router, thereby avoiding security risks.

It will be appreciated by those of skill in the art that the above described invention can be advantageously applied to an ad-hoc peer to peer wireless network in a number of ways. As an example, the above principles can be applied to the accounting and billing system of a system in a multiple provider overlapping environment. In such an embodiment, a network element counts each packet that it routes. Thus billing and reverse billing are used to compensate for shared routing. Counting is preferably done based on the source or destination system of each routed packet. Billing information can be accounted using the local system identifier. Depending on the direction of transfer, this can be the source or destination address. In a wireless-to-wireless or wireless-to-fixed transfer, the source of the packet is preferably used. In a fixed-to-wireless transfer, the destination address is preferably used. Thus, a system of billing for routing services used from other system operators is provided.

In a further embodiment of the present invention, the routing metric can be a function of the system identifier. In such a system, routing tables designate an optimal route as a function of the system identifier of the wireless transceiver that is originating or receiving the packet. Thus, route selection occurs in such a manner that the infrastructure owner steers packets to avoid costly elements, or to avoid routing packets from a system that does not compensate for routing.

The present invention is advantageous in that it allows multiple overlapping networks to preserve routing inside a single system. The present invention allows network operators to optimize the cost of their system, and allows improved security by limiting the possible paths to trusted system elements. Furthermore, the present invention allows QoS to be controlled by limiting the possible routes of a packet. In addition, the present invention allows congestion in a network to be bypassed only when needed by using other system elements that may impose additional costs to route through.

Of course those of ordinary skill in the art will readily appreciate that the principles of the present invention can be applied to source routing networks. In source routing networks, the source node determines exactly which nodes a message will traverse on the way to its destination node. The series of hops is included as part of the message. In this case the source node would use the above described "weight factor" into account among other factors in order to determine the path of each message. Thus, the present invention is not intended to be limited to networks in which each node determines the next hop independently, but rather is intended to be applied to networks in which the path is entirely or partially defined at the source node or some other node.

Although only a few exemplary embodiments of the present invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims.

What is claimed is:

1. A node, adapted for communicating with other nodes, some of which being in its own wireless ad-hoc peer-to-peer communication network and others of which being in at least one other wireless ad-hoc peer-to-peer communication network, said node comprising:
   a transceiver adapted to transmit a signal to at least one of the other nodes;
   a memory adapted to store routing information comprising data including a plurality of system weights, each of the other nodes having a respective system weight assigned thereto identifying a respective one of the networks in which that other node is operating;
   a controller adapted to control said transceiver to transmit said signal to one of said other nodes whose system weight meets a desired criteria; and
   wherein said system weight is determined based on service level cooperation agreement between said node's own wireless ad-hoc peer-to-peer network and with said at least one other wireless ad-hoc peer-to-peer communication network.

2. The node as claimed in claim 1, wherein at least one of said communication networks comprises an IEEE 802.11 network.

3. The node as claimed in claim 1, wherein said controller is further adapted to control said transceiver to transmit said signal to one of said other nodes based further on at least one of a plurality of factors selected from the group consisting of transmit power level, received signal strength indication, link quality, and quality of service requirements.

4. The node as claimed in claim 1, wherein said controller is adapted to assess a financial cost assigned to each of said plurality of other nodes based on said system weights.

5. The node as claimed in claim 4, wherein said controller is adapted to select one of said plurality of other nodes based on said financial cost assigned to each node.

6. The node as claimed in claim 1, wherein said controller is adapted to select one of said plurality of other nodes on a per packet basis.

7. The node as claimed in claim 4, wherein said controller is adapted to assess said financial cost assigned to each of said plurality of other nodes on a per packet basis.

8. The node as claimed in claim 5, wherein said controller selects at least one of said other nodes associated with the lowest financial cost.

9. The node as claimed in claim 1, wherein said routing information includes a routing table, and said controller is further adapted to control said transceiver to transmit said signal to one of said other nodes based on said system weight and said routing table.

10. A node as claimed in claim 1, wherein:
said controller is adapted to control said transceiver to transmit said signal to one of said other nodes whose system weight meets said desired criteria upon determining that said node is unable to communicate with any of said other nodes operating within its own network.

11. A method for controlling a node in a wireless ad-hoc peer-to-peer communications network, said node being adapted to communicate with other nodes, some of which being in its own wireless ad-hoc peer-to-peer communication network and others of which being in at least one other wireless ad-hoc peer-to-peer communications network, the method comprising the steps of:
determining available nodes to receive a transmission from said node;
determining a network identification assigned to each available node, each network identification identifying the network in which the node that network identification is assigned is operating;
determining a respective system weight corresponding to each network identification;
selecting one of said available nodes whose system weight corresponding to its assigned network identification meets a desired criteria;
transmitting data from said node to said selected node; and
wherein said system weight is determined based on service level cooperation agreement between said node's own wireless ad-hoc peer-to-peer network and with said at least one other wireless ad-hoc peer-to-peer communication network.

12. The method of claim 11, wherein the step of determining a set of available nodes comprises reviewing a routing table.

13. The method of claim 12, further comprising the steps of receiving route advertisements and updating the routing table.

14. The method of claim 11, wherein at least one of said communication networks includes an IEEE 802.11 network.

15. The method of claim 11, wherein said selecting and transmitting steps are performed on a per packet basis.

16. A method as claimed in claim 11, wherein:
said selecting step selects said one of said available nodes whose system weight meets said desired criteria upon determining that said node is unable to communicate with any of said other nodes operating within its own network.

17. A method for controlling a node in a wireless ad-hoc peer-to-peer communications network, said node being adapted to communicate with other nodes, some of which being in its own wireless ad-hoc peer-to-peer communication network and others of which being in at least one other wireless ad-hoc peer-to-peer communications network, the method comprising the steps of:
determining available nodes to receive a transmission from said node;
determining a network identification assigned to each available node, each network identification identifying the network in which the node that network identification is assigned is operating;
determining a respective system weight corresponding to each network identification;
selecting one of said available nodes whose system weight corresponding to its assigned network identification meets a desired criteria;
transmitting data from said node to said selected node;
calculating an overhead cost based on at least one of a plurality of factors selected from the group consisting of transmit power level, received signal strength indication, link quality, and quality of service requirements;
calculating a financial cost associated with transmitting to each available node based on said system weights; and
said selecting step selects said one of said available nodes based on said overhead cost and said financial cost.

18. The method of claim 17, wherein said selecting step further comprises selecting the available node associated with the lowest financial cost.

19. A computer readable medium of instructions adapted to control a node in a wireless ad-hoc peer-to-peer communications network, said node being adapted to communicate with other nodes in its own wireless ad-hoc peer-to-peer communication network and with other nodes in at least one other wireless ad-hoc peer-to-peer communications network, the computer readable medium of instructions comprising:
a first set of instruction adapted to control said node to determine available nodes to receive a transmission from said node,
a second set of instructions adapted to control said node to determine a network identification assigned to each available node, each network identification identifying the network in which the node that network identification is assigned is operating,
a third set of instructions adapted to control said node to assess a respective system weight corresponding to each network identification,
a fourth set of instructions adapted to control said node to select one of said available nodes whose system weight corresponding to its assigned network identification meets a desired criteria,
a fifth set of instructions adapted to control said node to transmit data to said selected node; and
wherein said system weight is determined based on service level cooperation agreement between said node's own wireless ad-hoc peer-to-peer network and with said at least one other wireless ad-hoc peer-to-peer communication network.

20. The computer readable medium of instructions of claim 19, wherein the first set of instructions is further adapted to review a routing table to determine said available nodes.

21. The computer readable medium of instructions of claim 20, further comprising a sixth set of instructions adapted to control said node to receive route advertisements and update said routing table.

22. The computer readable medium of instructions of claim 19, wherein at least one of said networks includes an IEEE 802.11 network.

23. The computer readable medium of instructions of claim 19, wherein said fourth and fifth sets of instructions are executed on a per packet basis.

24. A computer readable medium of instructions as claimed in claim 19, wherein:
said fourth set of instructions is further adapted to control said node to select said one of said available nodes whose system weight meets said desired criteria upon determining that said node is unable to communicate with any of said other nodes operating within its own network.

25. A computer readable medium of instructions adapted to control a node in a wireless ad-hoc peer-to-peer communications network, said node being adapted to communicate with other nodes in its own wireless ad-hoc peer-to-peer communication network and with other nodes in at least one other wireless ad-hoc peer-to-peer communications network, the computer readable medium of instructions comprising:
a first set of instruction adapted to control said node to determine available nodes to receive a transmission from said node,
a second set of instructions adapted to control said node to determine a network identification assigned to each available node, each network identification identifying the network in which the node that network identification is assigned is operating,
a third set of instructions adapted to control said node to assess a respective system weight corresponding to each network identification,
a fourth set of instructions adapted to control said node to select one of said available nodes whose system weight corresponding to its assigned network identification meets a desired criteria,
a fifth set of instructions adapted to control said node to transmit data to said selected node;
a sixth set of instructions adapted to control said node to calculate a financial cost associated with transmitting to each available node based on said system weights; and
a seventh set of instructions adapted to control said node to calculate an overhead cost based on at least one of a plurality of factors selected from the group consisting of transmit power level, received signal strength indication, link quality, and quality of service requirements, and said fourth set of instructions is further adapted to control said node to select said selected node based on said overhead cost and said financial cost.

26. The computer readable medium of instructions of claim 25, wherein said fourth set of instructions are further adapted to select the available node associated with the lowest financial cost.

27. A method for controlling a node in a wireless ad-hoc peer-to-peer communications network, said node being adapted to communicate with other nodes in its own wireless ad-hoc peer-to-peer communication network and with other nodes in at least one other wireless ad-hoc peer-to-peer communications network, the method comprising the steps of:
determining whether said node is able to communicate with any other nodes operating within its own network;
if said node is able to communicate with at least one of said other nodes operating within its own network, then selecting one of said other nodes as a selected node for communication;
if said node is unable to communicate with any of said other nodes operating within its own network, then determining whether said node is able to communicate with any other nodes operating in at least one network other than its own network, each of said other nodes being assigned a respective system weight identifying the network in which that node is operating;
if said node is able to communicate with a plurality of other nodes operating in at least one other network, selecting as said selected node for communication one of those other nodes whose assigned system weight meets a desired criteria; and
wherein said system weight is determined based on service level cooperation agreement between said node's own wireless ad-hoc peer-to-peer network and with said at least one other wireless ad-hoc peer-to-peer communication network.

28. The method of claim 27, further comprising:
transmitting a data packet from said node to said selected node.

29. The method of claim 27, wherein each of the determining steps comprises reviewing a routing table to determine available nodes with which said node is able to communicate.

30. The method of claim 27, wherein at least one of said communication networks includes an IEEE 802.11 network.

31. The method of claim 27, wherein each of said steps are performed on a per packet basis.

32. The method of claim 27, wherein:
each of said system weights represents a financial cost for transmitting a packet from said node to one of the nodes in that network.

* * * * *